(12) United States Patent
Hotozuka

(10) Patent No.: US 10,984,144 B2
(45) Date of Patent: Apr. 20, 2021

(54) DATA PUBLISHING SYSTEM

(71) Applicant: HONDA MOTOR CO., LTD., Tokyo (JP)

(72) Inventor: Yasuaki Hotozuka, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 202 days.

(21) Appl. No.: 16/406,357

(22) Filed: May 8, 2019

(65) Prior Publication Data

US 2019/0347365 A1    Nov. 14, 2019

(30) Foreign Application Priority Data

May 8, 2018  (JP) .............................. JP2018-089704

(51) Int. Cl.
```
G06F 7/60       (2006.01)
G06F 30/00      (2020.01)
G06F 3/0484     (2013.01)
G06F 21/62      (2013.01)
```
(52) U.S. Cl.
CPC .......... *G06F 30/00* (2020.01); *G06F 3/04842* (2013.01); *G06F 21/6209* (2013.01)

(58) Field of Classification Search
CPC ................................................. G06F 21/6209
USPC ............................................................ 703/1
See application file for complete search history.

(56) References Cited

U.S. PATENT DOCUMENTS

| 7,737,966 B2 * | 6/2010 | Nishida ................... G06F 30/00 345/419 |
| 2013/0145334 A1 * | 6/2013 | Nojima ................. G06F 30/398 716/115 |
| 2015/0220953 A1 * | 8/2015 | Hagiwara ............... H04L 67/22 705/7.34 |
| 2017/0344199 A1 * | 11/2017 | Taguchi .................. G06F 30/00 |

FOREIGN PATENT DOCUMENTS

JP        2007-309034 A    11/2007

* cited by examiner

*Primary Examiner* — Timothy A Mudrick
(74) *Attorney, Agent, or Firm* — Westerman, Hattori, Daniels & Adrian, LLP

(57) ABSTRACT

A data publishing system includes a design server that stores design data, a publishing server that stores published data, which is associated with the design data, and a browsing terminal. A user uses a keyboard and a mouse that are included in the browsing terminal and selects the design data stored in the design server and the published data stored in the publishing server. An arithmetic processing unit causes a monitor to display whether the selected design data and the selected published data match each other.

10 Claims, 11 Drawing Sheets

DATA PUBLISHING SYSTEM

CROSS REFERENCES TO RELATED APPLICATIONS

The present application claims priority under 35 U.S.C. § 119 to Japanese Patent Application No. 2018-089704, filed May 8, 2018, entitled "Data Publishing System." The contents of this application are incorporated herein by reference in their entirety.

TECHNICAL FIELD

The present disclosure relates to a data publishing system for publishing design data as published data and for browsing and using the data.

BACKGROUND

The data publishing system described in Japanese Unexamined Patent Application Publication No. 2007-309034 is a known example of a data publishing system of the related art. This data publishing system enables browsing of, for example, data regarding design drawings for foundation construction of a power plant and includes a management server, a terminal to be used by a foundation designer, a terminal to be used by a constructor, and a terminal to be used by a rebar processor. These terminals are connected to the management server via the Internet.

The management server includes a drawing approval status database and a foundation rebar database. A foundation designer logs into the management server via the terminal for the foundation designer and updates approval status data and the like in the drawing approval status database. A constructor logs into the management server via the terminal for the contractor and refers to the approval status data in the drawing approval status database. Then, the constructor confirms, on the basis of foundation drawing data that has been approved, a rebar to be processed and sends an order e-mail to a rebar processor in order to place an order for the rebar to be processed.

In general, in the case of an industrial product, such as an automobile, that includes a large number of components, the design of the product is frequently changed until the design is completed, and a large number of prototypes are fabricated with the design changes. In the case of the data publishing system described in Japanese Unexamined Patent Application Publication No. 2007-309034, since an order for rebar processing is placed on the basis of foundation drawing data that has been approved, the data publishing system cannot be applied to an industrial product such as that mentioned above whose prototypes are fabricated with design changes. If the data publishing system is applied, reprocessing or reworking of a prototype occurs each time drawing data is changed in accordance with a design change, and this leads to an increase in the manufacturing costs.

SUMMARY

The present application, for example, describes a data publishing system capable of reducing the frequency of occurrence of reprocessing of a prototype even in the case where a change of design data is likely to occur and capable of reducing the manufacturing costs.

In one embodiment, a data publishing system 1 according to the present disclosure includes a design data storage unit (a design server 3) that stores design data including data items regarding a plurality of product components, a published data storage unit (publishing server 4) that stores published data including data items regarding one or more product components, the one or more data items being associated with the design data, an output interface (a monitor 5a) that displays the published data stored in the published data storage unit, an input interface (a keyboard 5b, a mouse 5c) that is operated by a user, and a control unit (an arithmetic processing unit 5d, STEP 1 to STEP 13, STEP 82, STEP 84) that performs, when a user operates the input interface and selects any one of the data items regarding the product components included in the published data, which is displayed on the output interface, determination on whether the product component data item selected by the user matches one of the data items regarding the product components that is included in the design data stored in the design data storage unit and that corresponds to the product component data item selected by the user, and causes the output interface to display a result of the determination (lists 8a and 8b of results of comparison determination).

According to the data publishing system, for example, when a user operates the input interface and selects any one of the data items regarding the product components included in the published data, which is displayed on the output interface, it is determined whether the product component data item selected by the user matches one of the data items regarding the product components that is included in the design data stored in the design data storage unit and that corresponds to the product component data item selected by the user, and the determination result is displayed on the output interface. In this manner, the user can easily recognize whether the product component data item included in the published data selected by the user matches the product component data included in the design data by referencing to the result displayed on the output interface, and thus, when these data items match each other, a prototype can be fabricated by using design data that is estimated to be the most recent design data at that time. On the other hand, when these data items do not match each other, fabrication of a prototype using mismatched published data can be avoided. As a result, the frequency of occurrence of reprocessing of a prototype can be reduced, and the manufacturing costs can be reduced.

In the present disclosure, it is preferable that the design data include component identification (ID) information items each of which is at least one of a product component number of one of the plurality of product components (components) and a product component name of one of the plurality of product components (components), information items regarding shapes of the plurality of product components, and information items regarding coordinates and positions of the plurality of product components. It is also preferable that the published data include component ID information items each of which is at least one of a product component number of one of the one or more product components (components) and a product component name of one of the one or more product components (components) and component form information items each of which is at least one of an information item regarding a shape of one of the one or more product components and an information item regarding coordinates and a position of one of the one or more product components. It is also preferable that the control unit determine whether the component ID information items included in the published data match the component ID information items included in the design data and determine whether the component form information items included in the published data match information items included in the design data that correspond to the component form information items (STEP 82).

In general, in the case of determining match and mismatch between product components, it is sufficient to use, as information items that are to be compared, component ID information items each of which is at least one of a product component number and a product component name included in data regarding one of the product components and component form information items each of which is at least one of an information item regarding the shape of one of the product components, and an information item regarding the coordinates and the position of one of the product components. In contrast, according to the data publishing system, it is determined whether a component ID information item in published data matches a component ID information item in design data, and it is determined whether a component form information item in published data matches an information item in design data, the information item corresponding to the component form information item in the published data. Therefore, matches and mismatches of both the information items can be accurately determined.

In the present disclosure, it is preferable that the control unit calculate degree data (match percentage, mismatch percentage) that indicates at least one of a match percentage and a mismatch percentage of the published data with respect to the design data and cause the output interface to further display the degree data (the list 8b of results of comparison determination, STEP 84).

According to the data publishing system, since the degree data that indicates at least one of the match percentage and the mismatch percentage of published data with respect to design data is calculated, and the degree data is further displayed on the output interface, a user can easily recognize the match percentage and/or the mismatch percentage of published data with respect to design data, and the convenience can be enhanced.

In the present disclosure, it is preferable that the published data include browsing authority information that is set so as to be associated with identification information of a user and that indicates whether an authority to browse the published data is given to the user, and it is preferable that, when the published data is selected in a state where the identification information of a user has already been input via the input interface, the control unit refer to the identification information and the browsing authority information and cause the output interface to display whether the published data is browsable.

According to the data publishing system, when published data is selected in a state where the identification information of a user has already been input via the input interface, the identification information and the browsing authority information are referenced, and the output interface displays whether the published data is browsable. Thus, when the user accidentally selects published data for which the user does not have a browsing authority, the user can be properly informed of the fact. Consequently, the convenience can be further enhanced.

In the present disclosure, it is preferable that the output interface display an update command output unit (a data update button 19) that is selectable by a user via the input interface, and it is preferable that the control unit output, when a user selects the update command output unit, a command for updating at least one of the product component data items that is included in the published data and that does not match the design data to a person in charge of the design data (STEP 85, STEP 86).

According to the data publishing system, when a user selects the update command output unit, a command for updating at least one of the product component data items that is included in the published data and that does not match the design data is output to a person in charge of the design data. Thus, the presence of at least one of the product component data items that is included in the published data and that does not match the design data can be promptly transmitted to a person in charge of the corresponding design data, and the update of the product component data can be performed sooner. Consequently, the convenience can be further enhanced.

In the present disclosure, it is preferable that the control unit determine whether one of the product component data items selected by the user matches one of the product component data items that is included in the design data stored in the design data storage unit and that is the most recent data item.

According to the data publishing system, since it is determined whether one of the product component data items selected by the user matches one of the product component data items that is included in the design data stored in the design data storage unit and that is the most recent data item, when these data items match each other, a prototype can be fabricated by using design data that is the most recent design data at that time. As a result, the frequency of occurrence of reprocessing of a prototype can be further reduced, and the manufacturing costs can be further reduced.

In the present disclosure, it is preferable that the published data include link information items regarding links between the data items regarding the one or more product components and the data items regarding the product components that are included in the design data and that correspond to the one or more product components, and it is preferable that the control unit perform, based on the link information items, determination on whether a product component data item that corresponds to the product component data item selected by the user is present in the design data and cause the output interface to further display a result of the determination.

According to the data publishing system, it is determined, based on the link information items, whether a product component data item corresponding to one or more product component data items is present in design data, and the determination result is further displayed on the output interface. Thus, when a product component data item in the published data is not present in the design data due to, for example, a design change, the user can be properly informed of the fact. Consequently, the convenience can be further enhanced.

In the present disclosure, it is preferable that the published data include link information items regarding links between the data items regarding the one or more product components and the data items regarding the product components that are included in the design data and that correspond to the one or more product components, and it is preferable that the control unit perform, based on the link information items, determination on whether the product component data item selected by the user and one of the product component data items that is included in the design data and that corresponds to the selected product component data item are synchronized with each other and cause the output interface to display a result of the determination.

According to the data publishing system, it is determined, based on the link information items, whether the product component data item selected by the user and one of the product component data items that is included in the design data and that corresponds to the selected product component data item are synchronized with each other, and the determination result is further displayed on the output interface. Thus, when a product component data item that is included in the published data and a product component data item that is included in the design data and that corresponds to the product component data item included in the published data item are brought into an asynchronous state due to, for example, a design change, the user can be properly informed of the fact. Consequently, the convenience can be further enhanced. In the above explanation of the exemplary embodiment, specific elements with their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

The advantages of the disclosure will become apparent in the following description taken in conjunction with the following drawings.

DETAILED DESCRIPTION

A data publishing system according to an embodiment of the present disclosure will be described below with reference to the drawings. The data publishing system according to the present embodiment is constructed for publishing design data (a three-dimensional model) of an automobile designed by a designer as published data (a published model) to, for example, a prototype maker.

Figure 1:
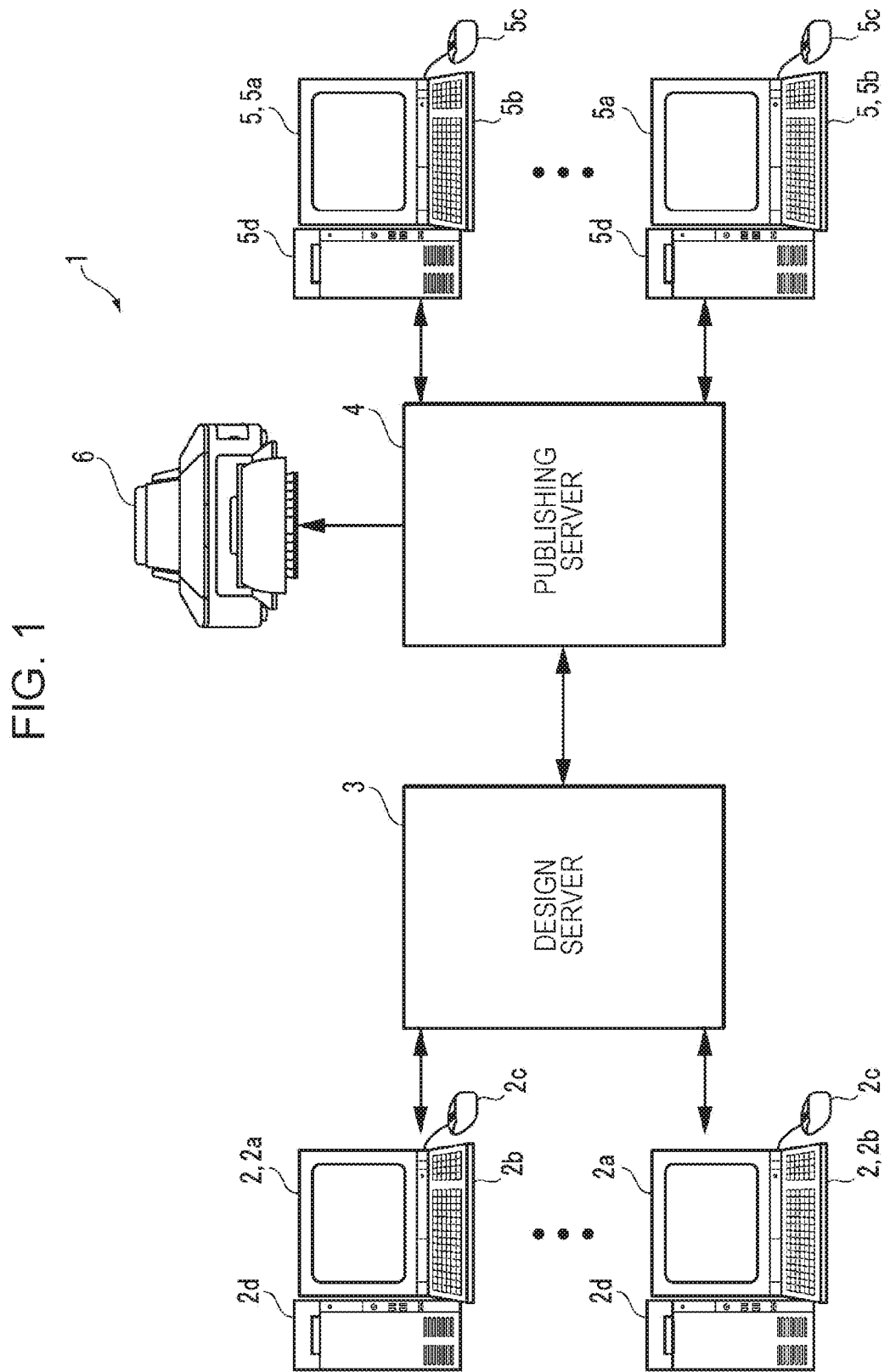
FIG. 1 is a diagram illustrating a configuration of a data publishing system according to an embodiment of the present disclosure.

As illustrated in FIG. 1, a data publishing system 1 includes a large number of design terminals 2 (only two of the design terminals 2 are illustrated in FIG. 1), a design server 3, a publishing server 4, a large number of browsing terminals 5 (only two of the browsing terminals 5 are illustrated in FIG. 1), and a printer 6. The design server 3 is configured to be capable of performing data communication with each of the design terminals 2 and the publishing server 4 via a network (e.g., a LAN or the Internet), which is not illustrated. The publishing server 4 is configured to be capable of performing data communication with each of the browsing terminals 5 and the printer 6 via a network (not illustrated).

Each of the design terminals 2 is provided for a designer to create design data and includes a monitor 2a, a keyboard 2b, a mouse 2c, and an arithmetic processing unit 2d. The arithmetic processing unit 2d includes a microcomputer, memory, and an input/output interface circuit, and a three-dimensional computer aided design (CAD) software has been installed in a storage of the microcomputer.

With the above configuration, a designer operates the keyboard 2b and the mouse 2c of one of the design terminals 2, so that design data is created as a three-dimensional model via the three-dimensional CAD software in the design terminal 2, and the created design data is transmitted to and stored into the design server 3. In this case, the design data is stored in the design server 3 as data including designer information and component information. As will be described below, the component information includes information items regarding an automobile model name, large unit names, small unit names, component names, the shapes of the components, and the coordinates and the positions of the components. Note that, in the present embodiment, a component corresponds to a product component.

The large unit names are unit names such as "engine", "body", and "chassis" that are used when classifying components of an automobile into rough units. The small unit names are unit names that are used when dividing a large unit into smaller units, and more specifically, "valve mechanism", "cylinder block", and the like correspond to small units when the large unit is "engine". The component names are the names of components included in a small unit, and for example, "valve body", "rocker arm", "camshaft", and the like correspond to the components when the small unit is "valve mechanism".

The design server 3 (a design data storage unit) includes a microcomputer, memory, and an input/output interface circuit and stores design data items regarding a large number of automobile models, which are input from the large number of design terminals 2, such that the information items included in each of the design data items are organized in a tree structure. More specifically, each of the design data items is stored in the design server 3 while the information items included the design data item, which are "automobile model", "large unit", "small unit", and "component", are organized in a tree structure in this order starting from the upper level toward the lower level of the tree structure (see FIG. 12, which will be described later).

When a specified data registration operation is performed by a designer, the design data is registered into a database in the design server 3 while the design server 3 associates link information with the design data, and the link information is registered into the database in the design server 3 as well as designer information and component information, which are included in the design data. In addition, the design server 3 creates a copy of the registered design data and transmits this copy to the publishing server 4. Note that, in this case, the registered design data may be directly transmitted to the publishing server 4 instead of the copy of the design data.

In contrast, the publishing server 4 (a published data storage unit) creates published data by associating information regarding a user's browsing authority with the copy of the design data, which is transmitted from the design server 3, and stores the published data. In this case, similar to design data, the published data is stored in the publishing server 4 while information items included in the published data, which are "automobile model", "large unit", "small unit", and "component", are organized in a tree structure in this order starting from the upper level toward the lower level of the tree structure (see FIG. 12, which will be described later). Note that the tree structure is not limited to those mentioned above and may be formed in various manners.

Each of the browsing terminals 5 is provided for a user (e.g., a prototype maker) to browse and use published data and includes a monitor 5a, a keyboard 5b, a mouse 5c, and an arithmetic processing unit 5d. Note that, in the present embodiment, the monitor 5a corresponds to an output interface. The keyboard 5b and the mouse 5c each correspond to an input interface. The arithmetic processing unit 5d corresponds to a control unit.

The arithmetic processing unit 5d includes a microcomputer, memory, and an input/output interface circuit. A software for executing the data match determination processing or the like, which will be described later, has been installed in a storage of the microcomputer, and in addition, user identifications (IDs) and passwords of users who use the browsing terminals 5 are stored in the storage of the microcomputer. Note that the browsing terminals 5 may be configured as terminals that do not execute control processing such as the data match determination processing and that are dedicated to data browsing, and the data match determination processing or the like may be executed by a remote terminal on the network. The determination results and the like may be displayed on the browsing terminals 5.

Figure 7:
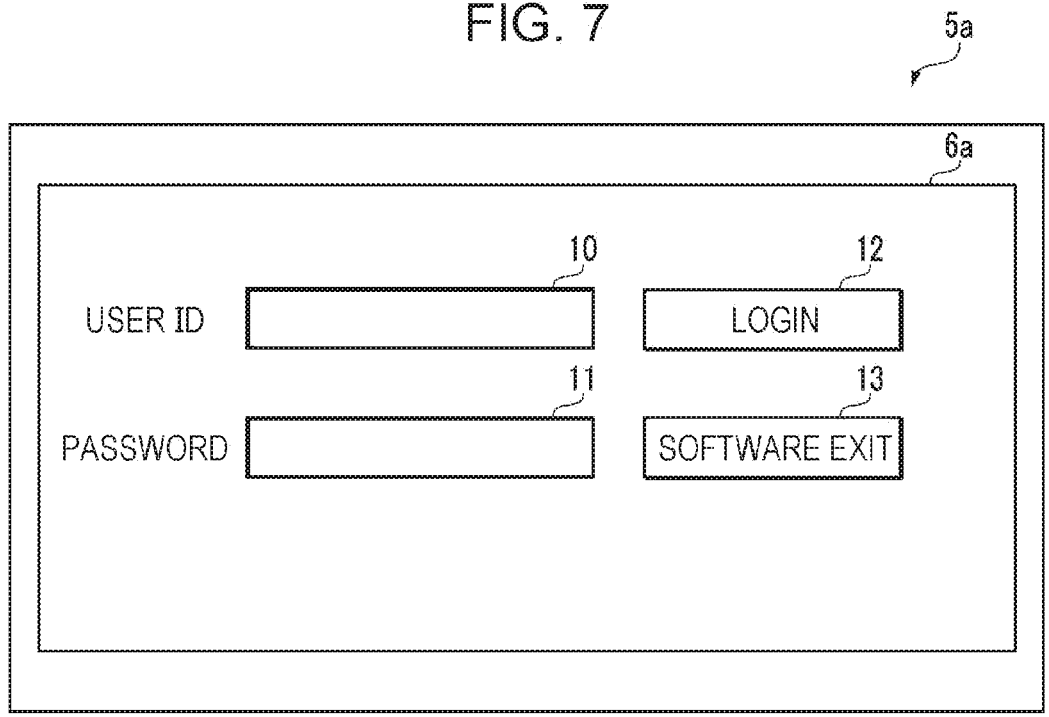
FIG. 7 is a diagram illustrating an initial screen that is displayed on a monitor when a browsing terminal is activated.

In one of the browsing terminals 5, when the monitor 5a and the arithmetic processing unit 5d are activated as a result of a user performing an operation of switching on the browsing terminal 5, and an application software for browsing published data is launched, an initial screen 6a, which is illustrated in FIG. 7, is displayed on the monitor 5a. A user ID input area 10, a password input area 11, a login button 12, and a software exit button 13 are displayed on the initial screen 6a.

The two input areas 10 and 11 are areas for inputting a user ID of a user and a password of the user, respectively. The login button 12 is used for performing a login operation after the user ID and the password have been input so as to make a transition to a state in which information items that are included in design data stored in the design server 3 and that are browsable by the user and published data that is stored in the publishing server 4 are browsable. The software exit button 13 is used for exiting the application software for browsing published data.

In the browsing terminal 5, when the user operates the keyboard 5b and the mouse 5c in a state where the above-mentioned initial screen 6a is displayed on the monitor 5a, as will be described below, various control processing operations such as the data match determination processing are performed in accordance with the operation. Note that, in the following description, an operation of at least one of the keyboard 5b and the mouse 5c that is performed by a user will be referred to as an "input operation".

The data match determination processing will be described below with reference to FIG. 2. In the data match determination processing, published data that is stored in the publishing server 4 and that is selected by a user and design data that is stored in the design server 3 and that is selected by the user are compared with each other in order to determine whether the published data and the design data match each other. The data match determination processing is executed by the arithmetic processing unit 5d at predetermined control intervals (e.g., several tens to several hundreds of milliseconds). The functions described by FIGS. 2-6 may be implemented by one of the servers 3 and 4 or another server connected to the terminal 5 via a network. Those servers may include CPUs which implement the functions by running a software.

Note that, in the present embodiment, although published data can be displayed on each of the browsing terminals 5 in various manners in accordance with a user's request (e.g., the whole published data can be displayed in a flat manner without organizing information items included in the published data in a tree structure), a case will be described below in which published data is displayed in such a manner that information items included in the published data are organized in a tree structure.

Figure 2:
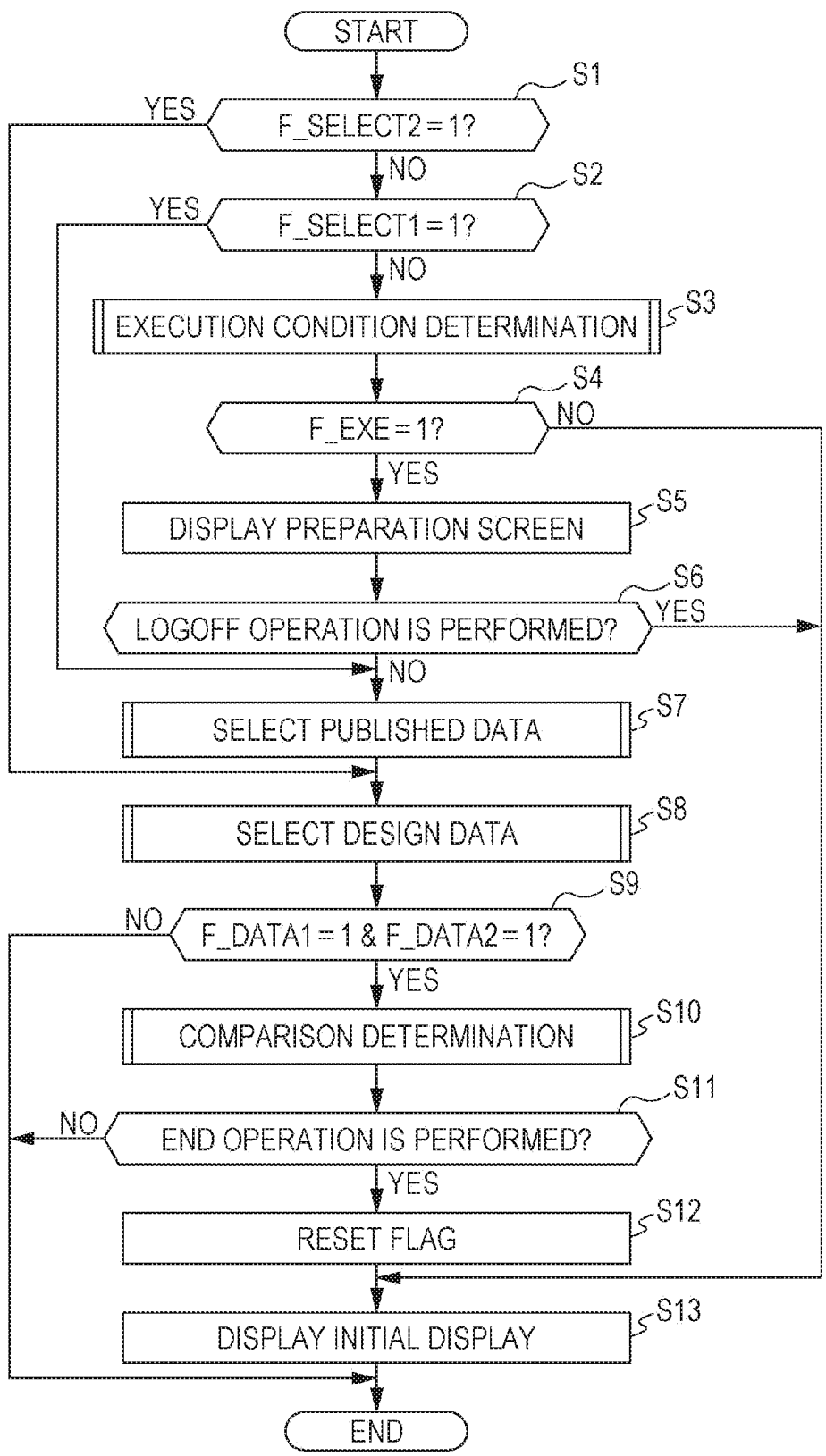
FIG. 2 is a flowchart illustrating data match determination processing.

As illustrated in FIG. 2, first, it is determined whether a design-data-selection-in-progress flag F_SELECT2 is "1" (STEP 1 in FIG. 2). The design-data-selection-in-progress flag F_SELECT2 is set to "1" during execution of the design data selection processing, which will be described later, otherwise the design-data-selection-in-progress flag F_SELECT2 is set to "0".

When the determination is affirmative (YES in STEP 1 in FIG. 2), the process continues to the design data selection processing (STEP 8 in FIG. 2), which will be described later.

On the other hand, when the determination is negative (NO in STEP 1 in FIG. 2), it is determined whether a published-data-selection-in-progress flag F_SELECT1 is "1" (STEP 2 in FIG. 2). The published-data-selection-in-progress flag F_SELECT1 is set to "1" during execution of the published data selection processing, which will be described later, otherwise the published-data-selection-in-progress flag F_SELECT1 is set to "0".

When the determination is affirmative (YES in STEP 2 in FIG. 2), the process continues to the published data selection processing (STEP 7 in FIG. 2), which will be described later.

On the other hand, when the determination is negative (NO in STEP 2 in FIG. 2), the execution condition determination processing is executed (STEP 3 in FIG. 2). In the execution condition determination processing, it is determined whether an execution condition of the data match determination processing is satisfied, and more specifically, the execution condition determination processing is executed as illustrated in FIG. 3.

Figure 3:
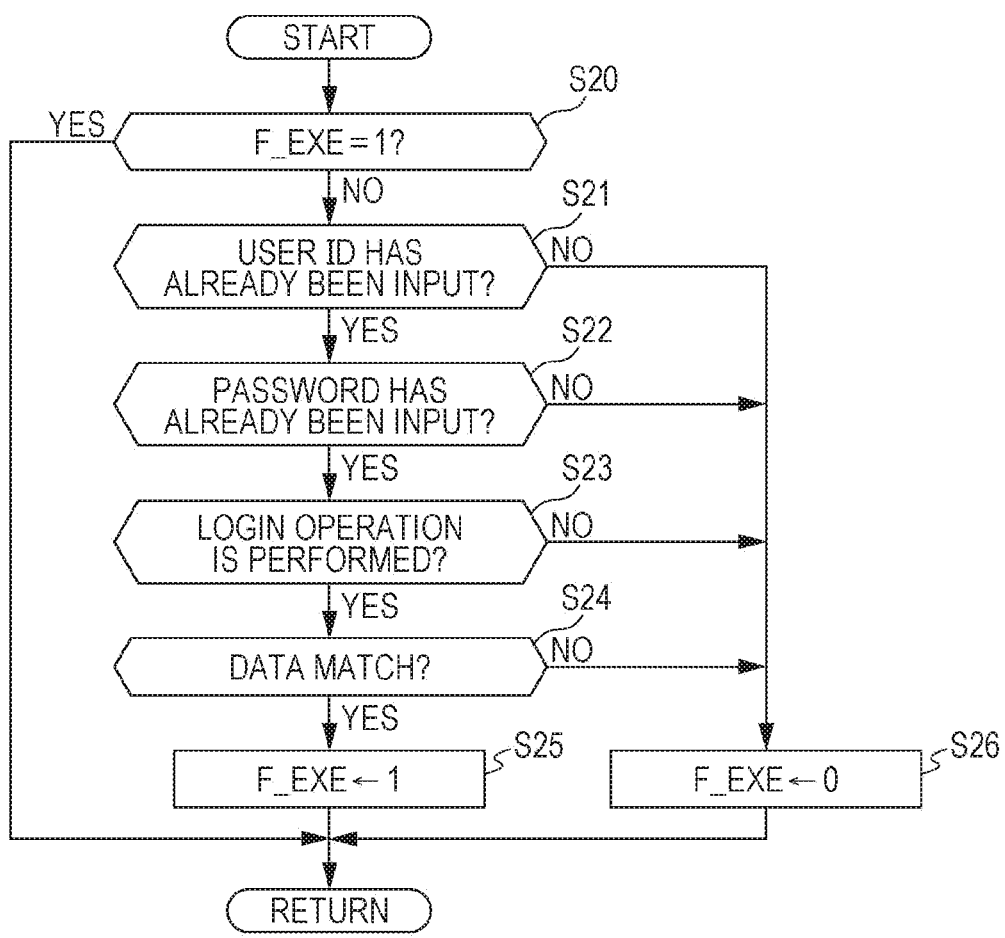
FIG. 3 is a flowchart illustrating execution condition determination processing.

As illustrated in FIG. 3, first, it is determined whether an execution-condition flag F_EXE is "1" (STEP 20 in FIG. 3). When the determination is affirmative, and the execution condition of the data match determination processing is satisfied at the previous or an earlier control timing (YES in STEP 20 in FIG. 3), the present processing is terminated.

On the other hand, when the determination is negative (NO in STEP 20 in FIG. 3), it is determined whether a user ID has already been input (STEP 21 in FIG. 3). In other words, it is determined whether a user has performed the input operation and has input a user ID into the above-mentioned input area 10 of the initial screen 6a.

When the determination is affirmative (YES in STEP 21 in FIG. 3), it is determined whether a password has already been input (STEP 22 in FIG. 3). In other words, it is determined whether the user has performed the input operation and has input a password into the above-mentioned input area 11 of the initial screen 6a.

When the determination is affirmative (YES in STEP 22 in FIG. 3), it is determined whether a login operation has been performed (STEP 23 in FIG. 3). More specifically, it is determined whether the user has performed the input operation and has clicked the login button 12 of the initial screen 6a.

When the determination is affirmative (YES in STEP 23 in FIG. 3), it is determined whether the user ID and the password match data items stored in the arithmetic processing unit 5d (STEP 24 in FIG. 3).

When the determination is affirmative (YES in STEP 24 in FIG. 3), it is determined that the execution condition of the data match determination processing is satisfied, and in order to indicate this determination, the execution-condition flag F_EXE is set to "1" (STEP 25 in FIG. 3). After that, the present processing is terminated.

On the other hand, when any one of the above determinations is negative, that is, in any of the cases where the user ID has not yet been input (NO in STEP 21 in FIG. 3), where the password has not yet been input (NO in STEP 22 in FIG. 3), where the login operation has not been performed (NO in STEP 23 in FIG. 3), and where the user ID and the password do not match the data items stored in the arithmetic processing unit 5d (NO in STEP 24 in FIG. 3), it is determined that the execution condition of the data match determination processing is not satisfied, and in order to indicate this determination, the execution-condition flag F_EXE is set to "0" (STEP 26 in FIG. 3). After that, the present processing is terminated.

Returning to FIG. 2, after the execution condition determination processing (STEP 3 in FIG. 2) has been executed as described above, it is determined whether the execution-condition flag F_EXE is "1" (STEP 4 in FIG. 2).

When the determination is negative (NO in STEP 4 in FIG. 2), that is, when the execution condition of the data match determination processing is not satisfied, the initial screen 6a is displayed on the monitor 5a (STEP 13 in FIG. 2). After that, the present processing is terminated.

Figure 8:
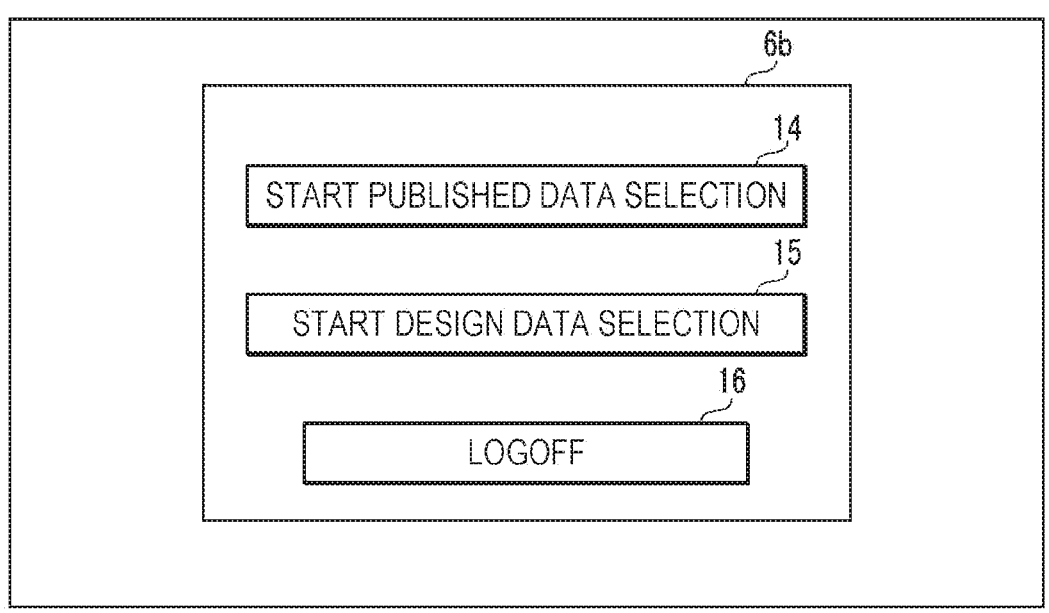
FIG. 8 is a diagram illustrating a preparation screen displayed on the monitor of the browsing terminal.

On the other hand, when the determination is affirmative (YES in STEP 4 in FIG. 2), that is, when the execution condition of the data match determination processing is satisfied, a preparation screen 6b that is illustrated in FIG. 8 is displayed on the monitor 5a (STEP 5 in FIG. 2).

As illustrated in FIG. 8, a published data selection start button 14, a design data selection start button 15, and a logoff button 16 are displayed on the preparation screen 6b. Each of these buttons 14 to 16 can be selected through the input operation, and the published data selection start button 14 is used for starting selection of published data in the publishing server 4.

The design data selection start button 15 is used for starting selection of design data in the design server 3, and the logoff button 16 is used for performing a logoff operation so as to return from the preparation screen 6b to the initial screen 6a. Note that, in the case of the data match determination processing illustrated in FIG. 2, as is apparent by reference to the contents of the flowcharts illustrated in FIG. 4 and FIG. 5, which will be described later, even if the published data selection processing (see FIG. 4) for selecting published data in the publishing server 4 or the design data selection processing (see FIG. 5) for selecting design data in the design server 3 is executed first, the other processing can be executed subsequently.

Next, it is determined whether the logoff operation has been performed (STEP 6 in FIG. 2). More specifically, it is determined whether the user has performed the input operation and has clicked the logoff button 16 of the preparation screen 6b. When the determination is affirmative, and the logoff button 16 has been clicked (YES in STEP 6 in FIG. 2), the initial screen 6a is displayed on the monitor 5a (STEP 13 in FIG. 2). After that, the present processing is terminated.

On the other hand, when the determination is negative (NO in STEP 6 in FIG. 2), the published data selection processing is executed (STEP 7 in FIG. 2). The published data selection processing is executed in order to select published data in the publishing server 4, and more specifically, the published data selection processing is executed as illustrated in FIG. 4.

Figure 4:
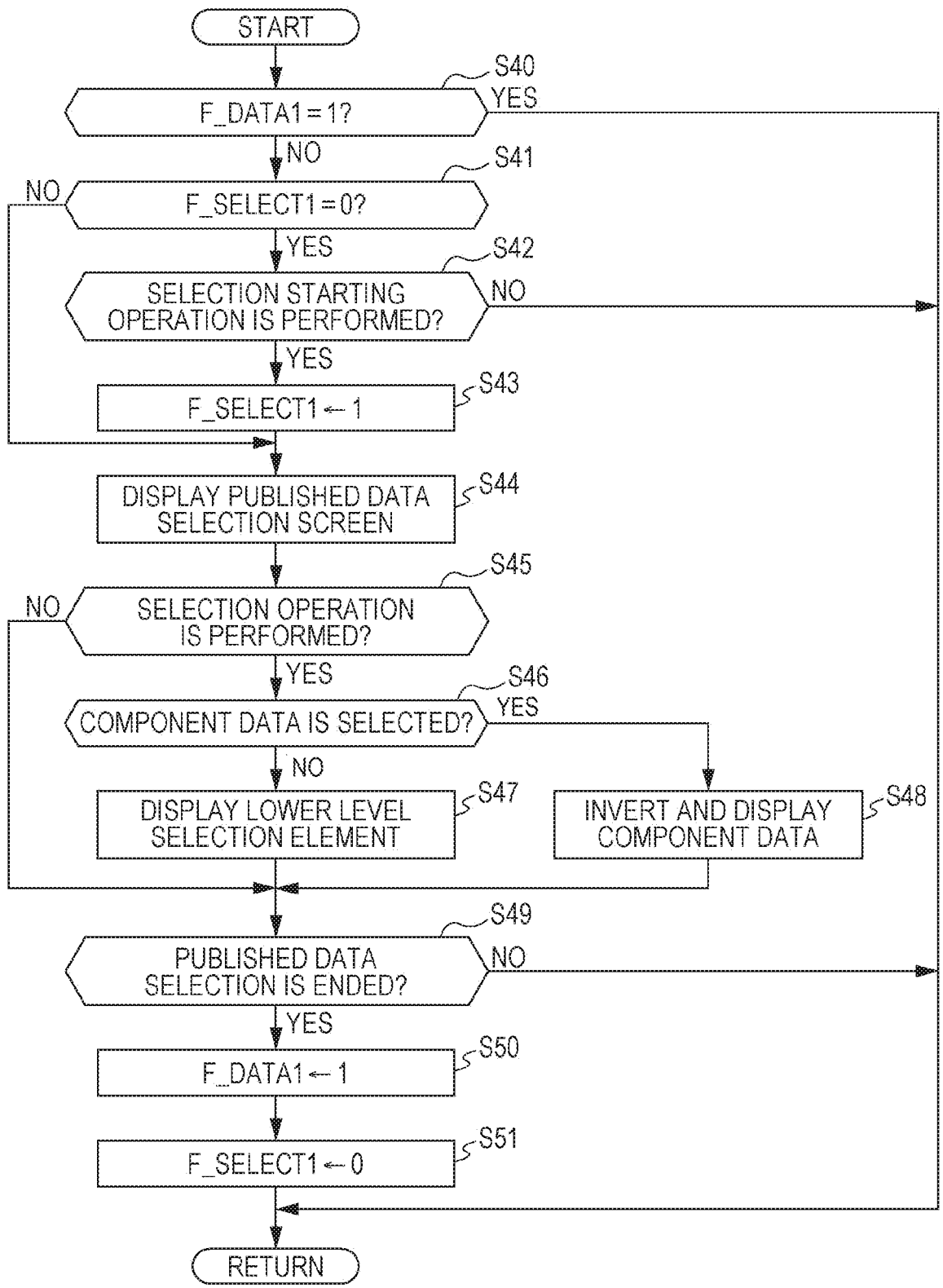
FIG. 4 is a flowchart illustrating published data selection processing.

As illustrated in FIG. 4, first, it is determined whether a published-data-selection-end flag F_DATA1 is "1" (STEP 40 in FIG. 4). When the determination is affirmative, and selection of the published data has been ended (YES in STEP 40 in FIG. 4), the present processing is terminated.

On the other hand, when the determination is negative (NO in STEP 40 in FIG. 4), it is determined whether the published-data-selection-in-progress flag F_SELECT1 is "0" (STEP 41 in FIG. 4).

When the determination is affirmative (YES in STEP 41 in FIG. 4), it is determined whether a selection starting operation has been performed (STEP 42 in FIG. 4). More specifically, it is determined whether the user has performed the input operation and has clicked the published data selection start button 14 of the preparation screen 6b.

When the determination is negative, and the published data selection start button 14 has not been clicked (NO in STEP 42 in FIG. 4), the present processing is terminated.

On the other hand, when the determination is affirmative, and the published data selection start button 14 has been clicked (YES in STEP 42 in FIG. 4), in order to indicate that selection of the published data is in progress, the published-data-selection-in-progress flag F_SELECT1 is set to "1" (STEP 43 in FIG. 4).

As described above, when the published-data-selection-in-progress flag F_SELECT1 is set to "1", or when the above determination is affirmative, and an equation of F_SELECT1=1 is satisfied at the previous or an earlier control timing (NO in STEP 41 in FIG. 4), a published data selection screen 7a is subsequently displayed on the monitor 5a (STEP 44 in FIG. 4).

Figure 9:
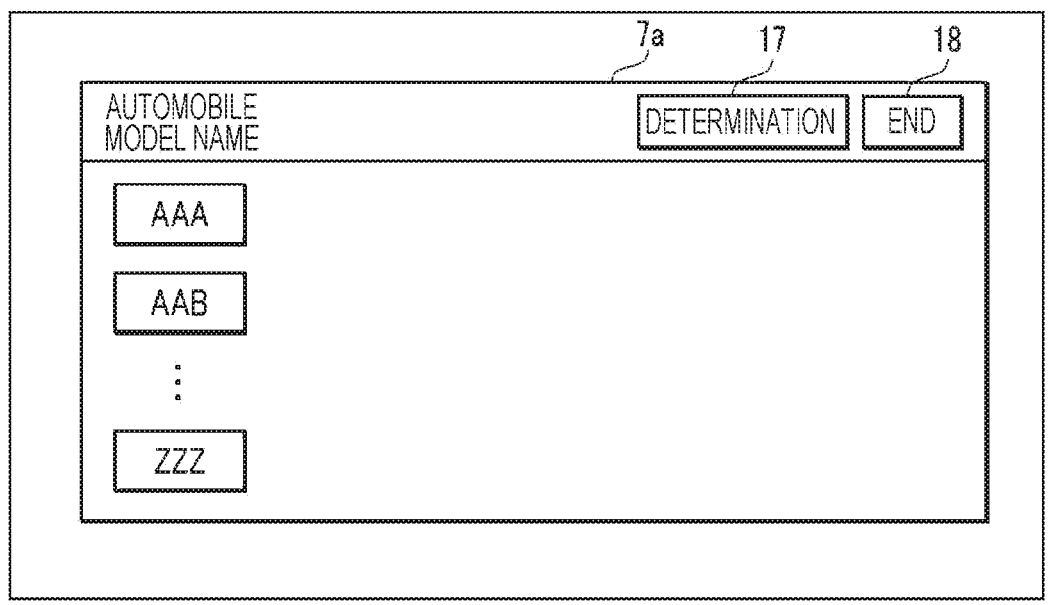
FIG. 9 is a diagram illustrating a published data selection screen.

At the first control timing of the present processing, in addition to automobile model names of "AAA", "AAB", ... "ZZZ", a determination button 17 and an end button 18 are displayed on the published data selection screen 7a as illustrated in FIG. 9. At the second control timing and the subsequent control timings, the contents displayed when the processing was ended at the previous control timing are displayed as they are on the published data selection screen 7a.

The determination button 17 is used for performing match determination on published data and design data after the published data and the design data have been selected, and the end button 18 is used for ending selection of published data or selection of design data.

Next, it is determined whether the user has performed the input operation and has selected published data (STEP 45 in FIG. 4). More specifically, for example, it is determined whether the automobile model name "AAA" displayed on the selection screen 7a, which is illustrated in FIG. 9, has been selected. When the determination is affirmative (YES in STEP 45 in FIG. 4), it is determined whether the data selected through the input operation is component data (STEP 46 in FIG. 4).

When the determination is negative (NO in STEP 46 in FIG. 4), selection elements at a lower level than the selected published data are displayed (STEP 47 in FIG. 4). More specifically, for example, when the automobile model name "AAA" displayed on the selection screen 7a, which is illustrated in FIG. 9, is selected, large unit names "A01", "A02", and the like are displayed on the selection screen 7a as selection elements at a lower level than the automobile model name as illustrated in FIG. 10.

Figure 10:
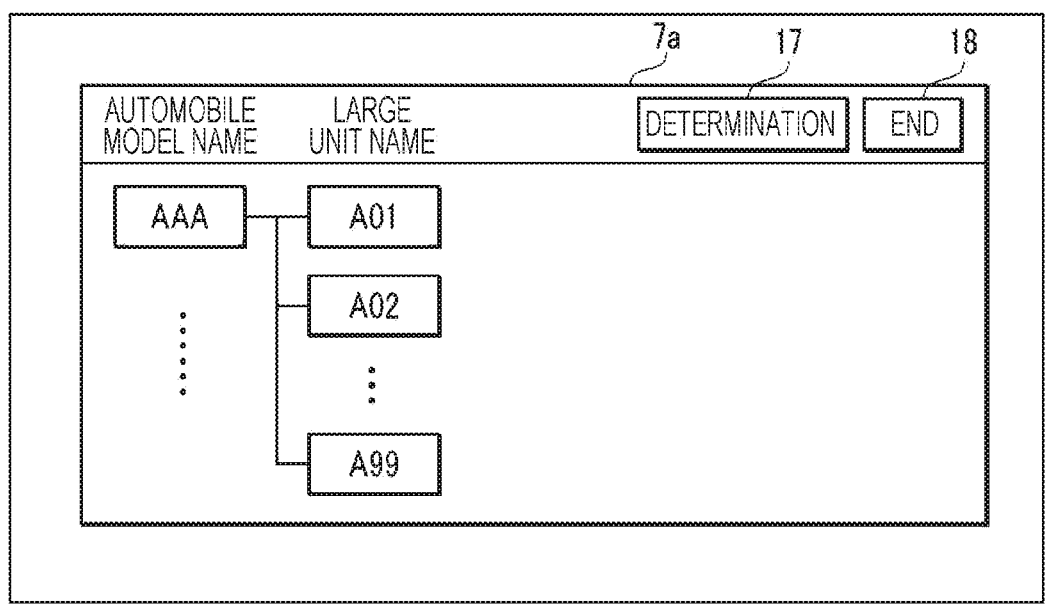
FIG. 10 is a diagram illustrating a selection screen when an automobile model name is selected.
Figure 11:
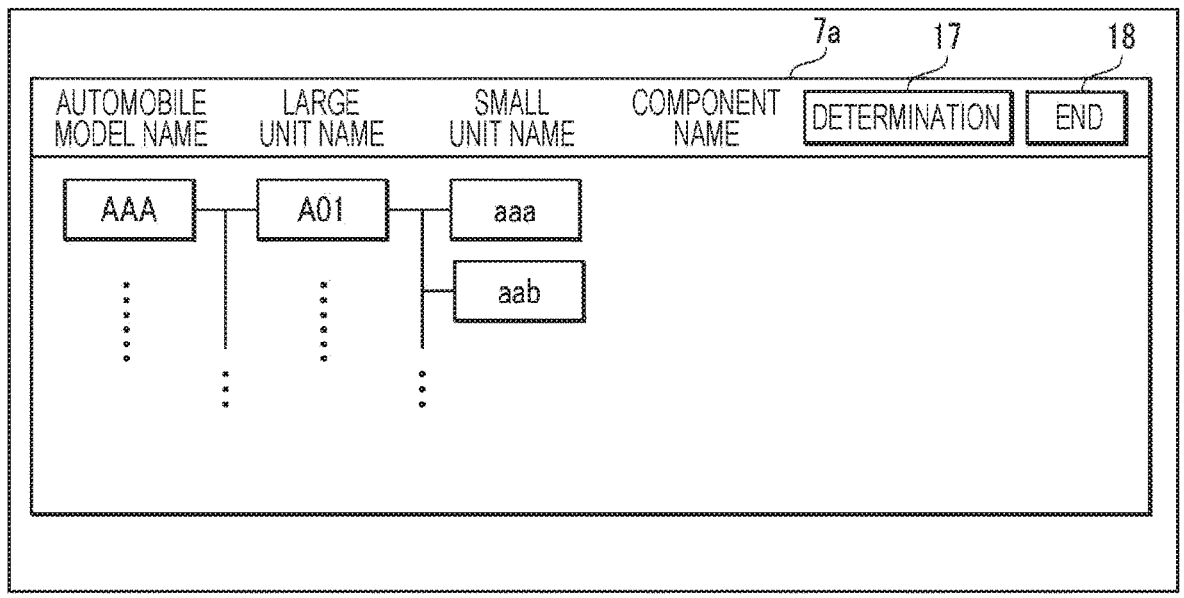
FIG. 11 is a diagram illustrating a selection screen when a large unit name is selected.
Figure 12:
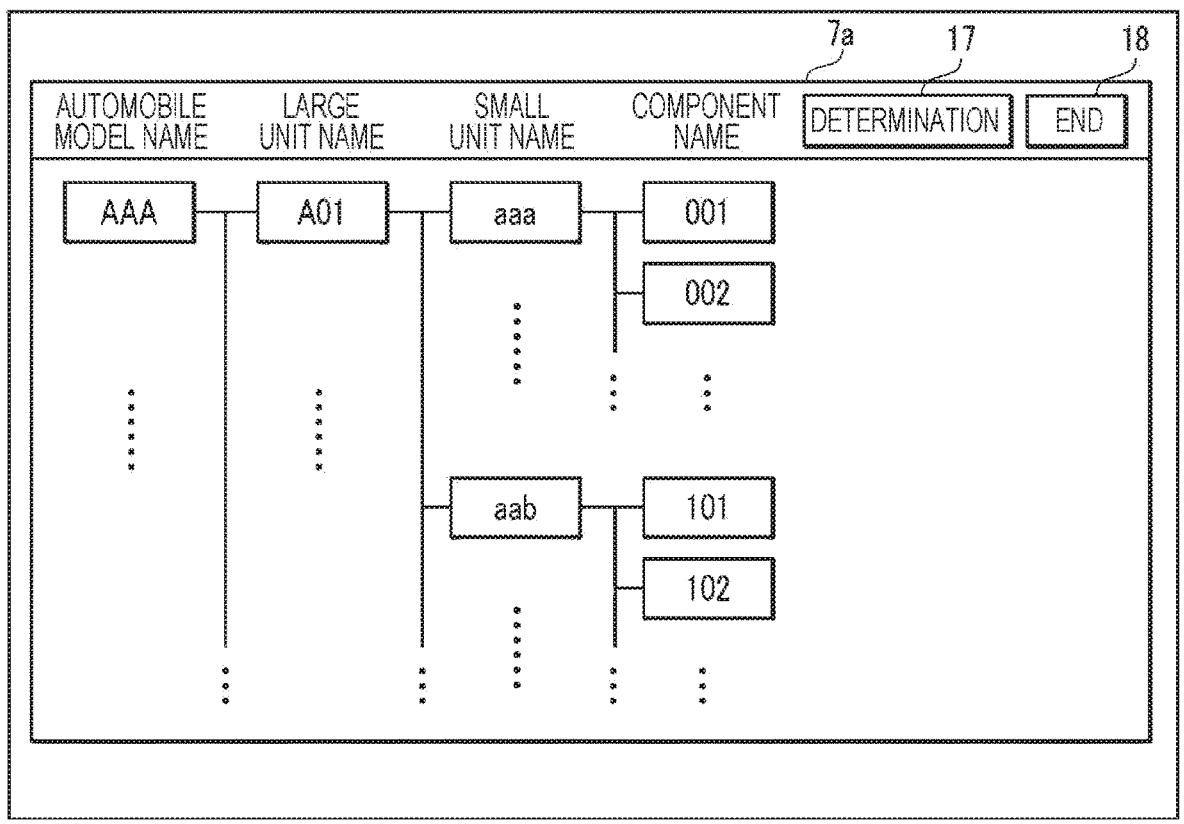
FIG. 12 is a diagram illustrating a selection screen when a small unit name is selected.

In the state illustrated in FIG. 10, when the large unit name "A01" is selected, small unit names "aaa", "aab", and the like are displayed on the selection screen 7a as selection elements at a lower level than the large unit name as illustrated in FIG. 11. In addition, in the state illustrated in FIG. 11, when the small unit names "aaa" and "aab" are selected, component names "001", "002" and the like are displayed on the selection screen 7a as selection elements at a lower level than the small unit name "aaa", and component names "101", "102" and the like are displayed on the selection screen 7a as selection elements at a lower level than the small unit name "aab" as illustrated in FIG. 12.

Figure 13:
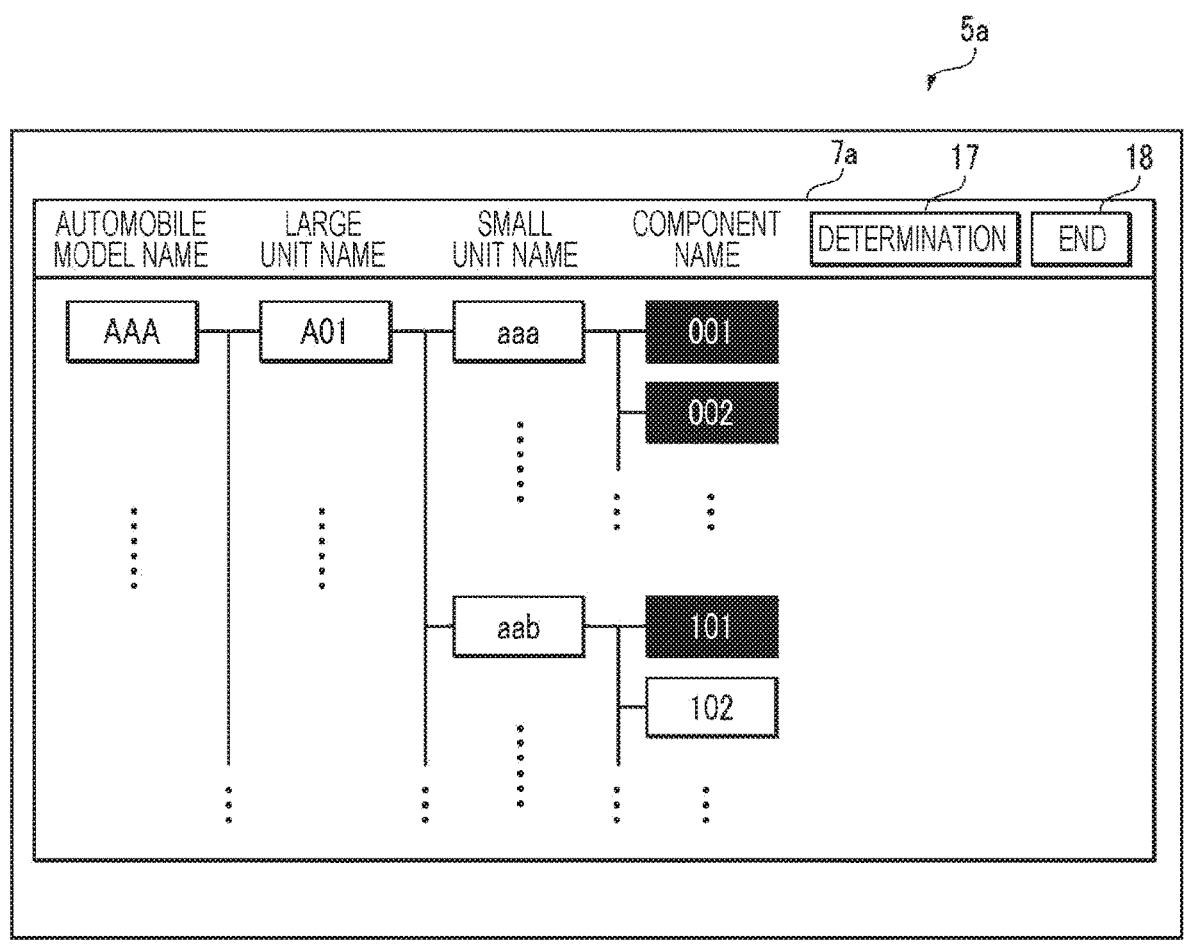
FIG. 13 is a diagram illustrating a selection screen when a component name is selected and inverted.

On the other hand, when the above determination is affirmative (YES in STEP 46 in FIG. 4), that is, when the data selected through the input operation is component data, the selected component data is inverted and displayed (STEP 48 in FIG. 4). For example, in the state illustrated in FIG. 12, when the component data items "001", "002", and "101" are selected, these data items are inverted and displayed as illustrated in FIG. 13. Note that, in the present embodiment, the component data items correspond to data items regarding product components that are included in design data.

On the other hand, in any of the cases where published data has not been selected (NO in STEP 45 in FIG. 4), where selection elements at a lower level than selected published data are displayed (STEP 47 in FIG. 4), and where a selected component data item is inverted and displayed (STEP 48 in FIG. 4), it is determined subsequently whether selection of published data has been ended (STEP 49 in FIG. 4).

When the determination is affirmative, and when the user has performed the input operation and has clicked the end button 18 on the selection screen 7a (YES in STEP 49 in FIG. 4), in order to indicate that selection of the published data has been ended, the published-data-selection-end flag F_DATA1 is set to "1" (STEP 50 in FIG. 4).

Next, the above-mentioned published-data-selection-in-progress flag F_SELECT1 is set to "0" (STEP 51 in FIG. 4). After that, the present processing is terminated.

On the other hand, when the determination is negative (NO in STEP 49 in FIG. 4), the present processing is terminated.

Note that, in the above-described published data selection processing, when a large unit name is selected, selection elements at a lower level than the selected large unit name are each displayed in an unselected state as an example. However, instead of this configuration, when a large unit name is selected, all the selection elements at a lower level than the selected large unit name may each be displayed in a selected state. This is common to the design data selection processing, which will be described below.

Returning to FIG. 2, after the published data selection processing (STEP 7 in FIG. 2) has been executed as described above, the design data selection processing is executed (STEP 8 in FIG. 2). The design data selection processing is executed in order to select design data in the design server 3, and more specifically, the design data selection processing is executed as illustrated in FIG. 5.

Figure 5:
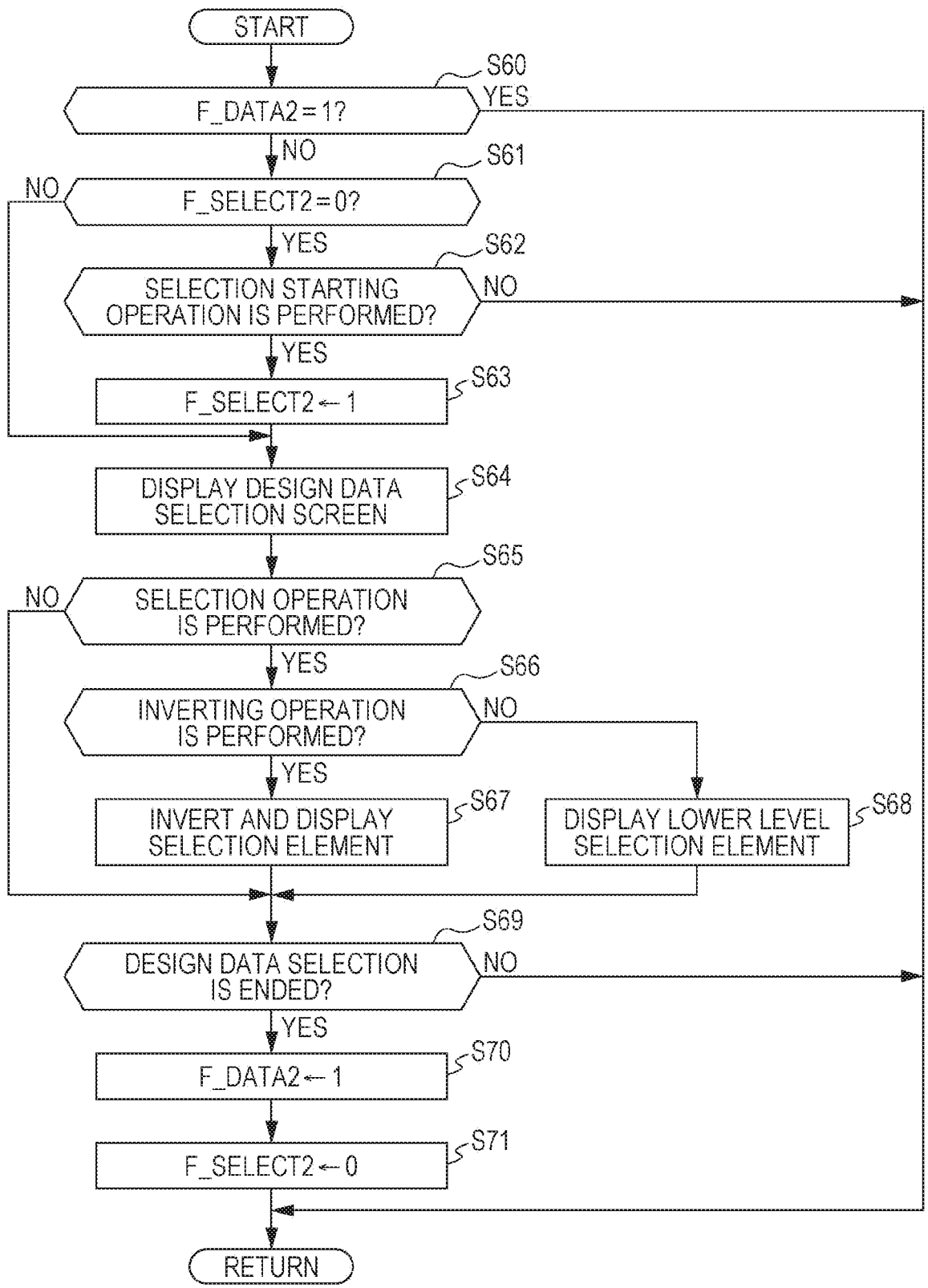
FIG. 5 is a flowchart illustrating design data selection processing.

As illustrated in FIG. 5, first, it is determined whether a design-data-selection-end flag F_DATA2 is "1" (STEP 60 in FIG. 5). When the determination is affirmative, and selection of the design data has been ended (YES in STEP 60 in FIG. 5), the present processing is terminated.

On the other hand, when the determination is negative (NO in STEP 60 in FIG. 5), it is determined whether the design-data-selection-in-progress flag F_SELECT2 is "0" (STEP 61 in FIG. 5).

When the determination is affirmative (YES in STEP 61 in FIG. 5), it is determined whether the selection starting operation has been performed (STEP 62 in FIG. 5). More specifically, it is determined whether the user has performed the input operation and has clicked the design data selection start button 15 on the preparation screen 6b.

When the determination is negative, and the design data selection start button 15 has not been clicked (NO in STEP 62 in FIG. 5), the present processing is terminated.

On the other hand, when the determination is affirmative, and the design data selection start button 15 has been clicked (YES in STEP 62 in FIG. 5), in order to indicate that selection of the design data is in progress, the design-data-selection-in-progress flag F_SELECT2 is set to "1" (STEP 63 in FIG. 5).

As described above, when the design-data-selection-in-progress flag F_SELECT2 is set to "1", or when the above determination is negative, and an equation of F_SELECT2=1 is satisfied at the previous or an earlier control timing (NO in STEP 61 in FIG. 5), a design data selection screen is subsequently displayed on the monitor 5a (STEP 64 in FIG. 5).

At the first control timing of the present processing, although not illustrated, similar to the above-mentioned selection screen 7a illustrated in FIG. 9, the determination button 17 and the end button 18 are displayed on the design data selection screen in addition to the automobile model names of "AAA", "AAB", . . . "ZZZ". At the second control timing and the subsequent control timings, the contents displayed when the processing was ended at the previous control timing are displayed as they are on the design data selection screen.

Next, it is determined whether selection of design data has been performed (STEP 65 in FIG. 5). When the determination is affirmative (YES in STEP 65 in FIG. 5), it is determined whether an inverting operation has been performed (STEP 66 in FIG. 5).

More specifically, in a state where a selection element at the upper level and selection elements at the lower level are displayed, when the user performs the input operation and clicks the selection element at the upper level, it is determined that the inverting operation is performed on the selection element at the upper level. For example, in a state where a large unit name is displayed as a selection element at the upper level, and small unit names are displayed as selection elements at the lower level, when the large unit name is clicked, it is determined that the inverting operation is performed on the large unit name.

In this case, in a state where a component name is displayed, when the component name is clicked, it is also determined that the inverting operation is performed on the component name. However, in the case of the present system, a user generally performs the inverting operation on a large unit name or a small unit name from the standpoint of saving time and labor and from the standpoint of convenience. Note that, in the present embodiment, data items regarding large units, data items regarding small units, and data items regarding components correspond to data items regarding product components that are included in design data.

When the determination is affirmative (YES in STEP 66 in FIG. 5), the selection element, which has been clicked, is inverted and displayed (STEP 67 in FIG. 5).

On the other hand, when the determination is negative (NO in STEP 66 in FIG. 5), selection elements at a lower level than the clicked selection element are displayed (STEP 68 in FIG. 5). For example, in a state where an automobile model name and a large unit name are displayed, when the large unit name is clicked, small unit names are displayed.

On the other hand, in any of the cases where design data has not been selected (NO in STEP 65 in FIG. 5), where a selection element that has been clicked is inverted and displayed (STEP 67 in FIG. 5), and where selection elements at the lower level are displayed (STEP 68 in FIG. 5), it is determined subsequently whether selection of the design data has been ended (STEP 69 in FIG. 5).

When the determination is affirmative (YES in STEP 69 in FIG. 5), that is, when the user has performed the input operation and has clicked the end button 18 on the selection screen, in order to indicate that selection of the design data has been ended, the design-data-selection-end flag F_DATA2 is set to "1" (STEP 70 in FIG. 5).

Next, the above-mentioned design-data-selection-in-progress flag F_SELECT2 is set to "0" (STEP 71 in FIG. 5). After that, the present processing is terminated.

On the other hand, when the determination is negative (NO in STEP 69 in FIG. 5), the present processing is terminated.

Returning to FIG. 2, after the design data selection processing (STEP 8 in FIG. 2) has been executed as described above, it is determined whether both the published-data-selection-completion flag F_DATA1 and the design-data-selection-end flag F_DATA2 are "1" (STEP 9 in FIG. 2).

When the determination is negative (NO in STEP 9 in FIG. 2), that is, when selection of the published data and/or selection of the design data has not been ended, the present processing is terminated.

On the other hand, when the determination is affirmative (YES in STEP 9 in FIG. 2), that is, when both selection of the published data and selection of the design data have been ended, the comparison determination processing is performed (STEP 10 in FIG. 2). In the comparison determination processing, published data and design data that have been selected by a user are compared with each other so as to determine the match percentage between the published data and the design data, and more specifically, the comparison determination processing is executed as illustrated in FIG. 6.

Figure 6:
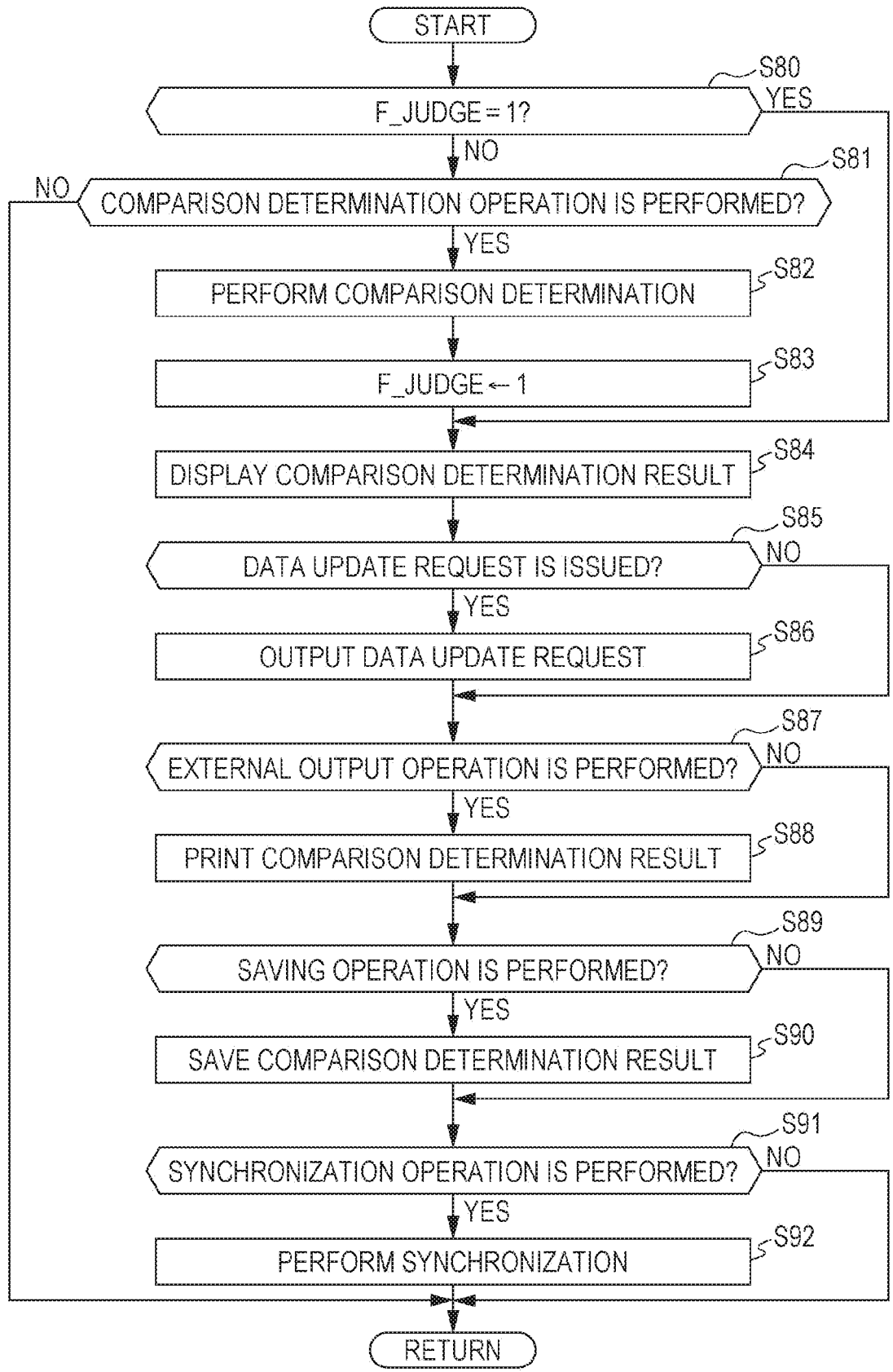
FIG. 6 is a flowchart illustrating comparison determination processing.

As illustrated in FIG. 6, first, it is determined whether a comparison-determination-executed flag F_JUDGE is "1" (STEP 80 in FIG. 6). When the determination is negative (NO in STEP 80 in FIG. 6), it is determined whether a comparison determination operation has been performed (STEP 81 in FIG. 6). More specifically, it is determined that the comparison determination operation is performed when the determination button 17 that is displayed on the published data selection screen 7*a* or on the design data selection screen is clicked, otherwise it is determined that the comparison determination operation is not performed.

When the determination is negative (NO in STEP 81 in FIG. 6), that is, when the comparison determination operation has not been performed, the present processing is terminated.

On the other hand, when the above determination is affirmative, and the comparison determination operation has been performed (YES in STEP 81 in FIG. 6), comparison determination is performed on the published data and the design data, which have been selected by the user, by using a predetermined algorithm (STEP 82 in FIG. 6).

Next, in order to indicate that the comparison determination has been performed on the published data and the design data, the comparison-determination-executed flag F_JUDGE is set to "1" (STEP 83 in FIG. 6).

As described above, when the comparison-determination-executed flag F_JUDGE is set to "1", or when the above determination is affirmative, and an equation of F_JUDGE=1 is satisfied at the previous or an earlier control timing (YES in STEP 80 in FIG. 6), results of the comparison determination are subsequently displayed on the monitor 5*a* (STEP 84 in FIG. 6).

Figure 14:
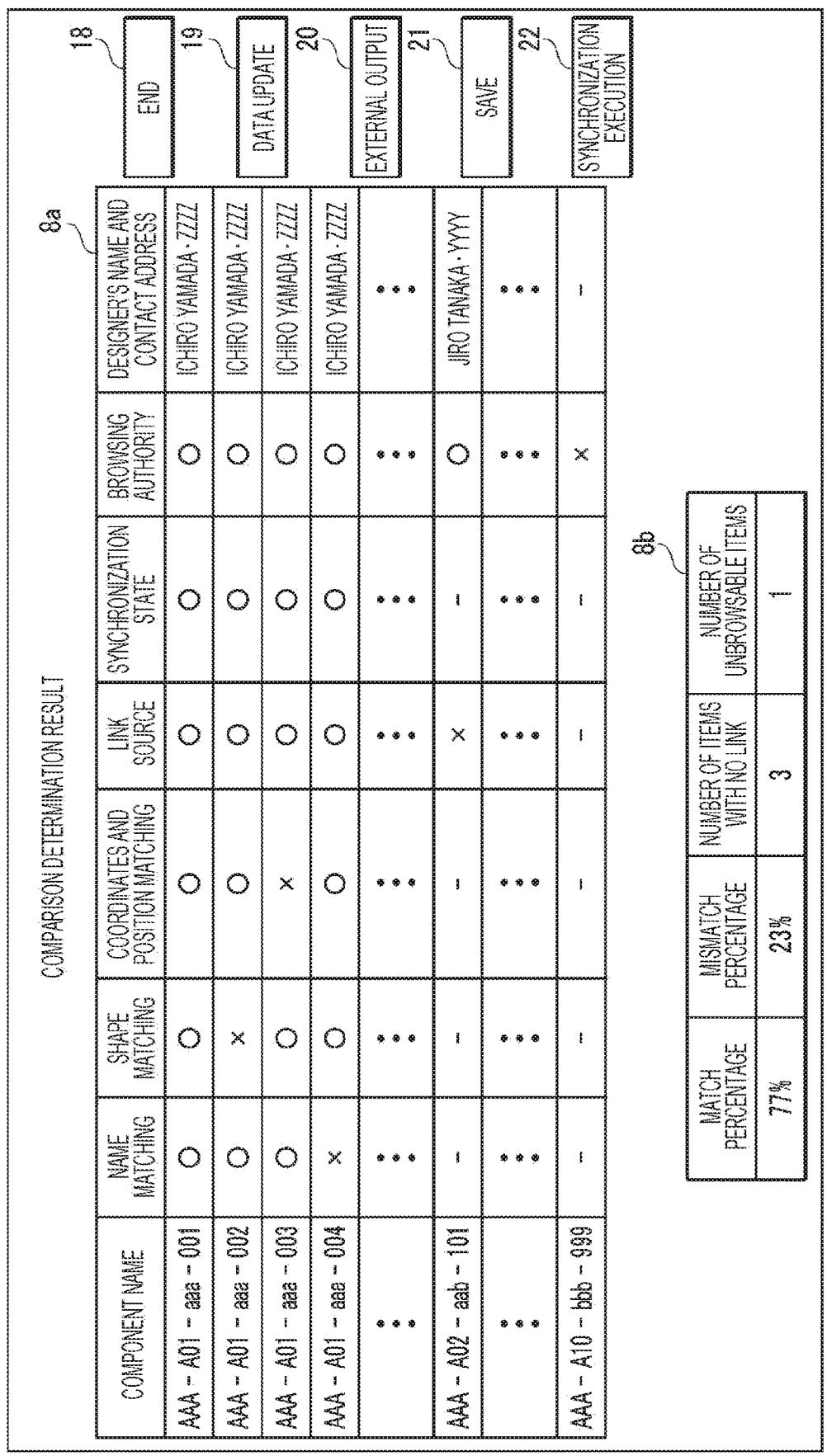
FIG. 14 is a diagram illustrating a screen displaying an example of comparison determination results.

The results of the comparison determination are displayed as lists 8*a* and 8*b* on the monitor 5*a* as illustrated in FIG. 14. As illustrated in FIG. 14, in the list 8*a,* each "component name" in the published data selected by the user is displayed in a treelike manner, such as [automobile model name-large unit name-small unit name-component name]. In addition, the following columns are displayed for each component: "name matching", "shape matching", "coordinates and position matching", "link source", "synchronization state", "browsing authority", and "designer's name and contact address".

The column "name matching" is provided for indicating whether the name (or a unique ID) of a link source that is held by a component included in selected published data and the name (or a unique ID) of a component that is included in selected design data match each other. When these names (or these unique IDs) match each other, "○" is displayed in a corresponding one of the fields forming the column "name matching", and when these names (or these unique IDs) do not match each other, "×" is displayed in the field.

The column "shape matching" is provided for indicating whether the shape of a component included in the published data and the shape of a component included in the design data match each other. In the case where "○" is displayed in a corresponding one of the fields forming the column "synchronization state", which will be described later, a Boolean subtraction operation is performed on a component in the published data and a corresponding component in the design data, and when the remaining amount is equal to or lower than a certain threshold, or when the deviation between the barycentric coordinates of the component in the published data and the barycentric coordinates the corresponding component in the design data is equal to or lower than a certain threshold, "○" is displayed in a corresponding one of the fields forming the column "shape matching", otherwise "×" is displayed in the field.

The column "coordinates and position matching" is provided for indicating whether the three-dimensional coordinates and the position of a component in the published data match those of a component in the design data match one another. When the three-dimensional coordinates and the positions of these components match one another, "○" is displayed in a corresponding one of the fields forming the column "coordinates and position matching", and when the three-dimensional coordinates and the positions of these components do not match one another, "×" is displayed in the field.

The column "link source" is provided for indicating whether a component data item that is a link source of a component data item included in the published data is present in the selected design data. When the component data item, which is the link source, is present in selected the design data, "○" is displayed in a corresponding one of the fields forming the column "link source", and when the component data item, which is the link source, is not present in the selected design data, "×" is displayed in the field. In addition, in the case where the component data item, which is the link source, is not present in the selected design data, "−" is displayed in the corresponding fields forming the columns "name matching", "shape matching", "coordinates and position matching", and "synchronization state".

The column "synchronization state" is provided for indicating whether the published data and the design data are synchronized with each other. The design data, which corresponds to the published data, is called by using link information held by the published data, and the synchronization state between the published data and the design data is determined. When the published data is synchronized with the design data, "○" is displayed in a corresponding one of the fields forming the column "synchronization state", and when the published data is not synchronized with the design data, "×" is displayed in the field. Note that "−" is displayed in the field in the case where "×" is displayed in a corresponding one of the fields forming the column "link source".

The column "browsing authority" is provided for indicating whether the user has a browsing authority for the published data. This determination is performed by comparing a user ID and a browsing authority information item included in the published data. When the user has a browsing authority for the published data, "○" is displayed in a corresponding one of the fields forming the column "browsing authority", and when the user does not have a browsing authority for the published data, "×" is displayed in the field. In addition, in the case where the user does not have a browsing authority for the published data, "−" is displayed in the corresponding fields forming the columns "name matching", "shape matching", "coordinates and position matching", "link source", and "designer's name and contact address". The name of a designer of the design data and the designer's contact address such as a telephone number (denoted as "ZZZZ" or "YYYY" in FIG. 14) are displayed in a corresponding one of the fields forming the column "designer's name and contact address".

In the list 8b, which is displayed on the lower side of the monitor 5a, the following columns are displayed: "match percentage", "mismatch percentage", "number of items with no link", and "number of unbrowsable items". The column "number of unbrowsable items" indicates the number of data items that are included in the published data selected by the user and for which the user does not have a browsing authority, and the number of such unbrowsable data items is determined by referencing to the user ID of the user and a browsing authority information item included in the component data selected by the user. The column "number of items with no link" indicates the number of data items that are included in the published data selected by the user and each of which does not have a link source, which would be a component data item that is present in the design data.

The column "match percentage" indicates the percentage (%) of the number of data items regarding the components that are included in the published data selected by the user and whose names, shapes, coordinates, and positions match those of the components included in the design data selected by the user with respect to the number of data items that are included in the published data selected by the user and that have "○" or "×" displayed in the corresponding fields in the columns "name matching", "shape matching", and "coordinates and position matching" (i.e., the number of data items for each of which the user has a browsing authority and in each of which link information is present). Note that, although data items each having "×" displayed in the corresponding field in the column "synchronization state" are subjected to calculation of the above "match percentage", in this case, these data items are handled as mismatched data items.

The column "mismatch percentage" indicates the percentage (%) of the number of data items regarding the components that are included in the published data selected by the user and at least one of whose names, shapes, coordinates, and positions does not match that of the components included in the design data selected by the user with respect to the number of data items that are included in the published data and that have "○" or "×" displayed in the corresponding fields in the columns "name matching", "shape matching", and "coordinates and position matching". The mismatch percentage is calculated by subtracting the match percentage from a value of 100. Note that, in the present embodiment, the match percentage and the mismatch percentage each correspond to degree data.

In addition to the end button 18, as illustrated in FIG. 14, a data update button 19, an external output button 20, a save button 21, and a synchronization execution button 22 are displayed on the screen of the monitor 5a displaying results of comparison determination.

As will be described later, the data update button 19 (an update command output unit) is used for requesting a designer to update data items regarding the components that are included in published data and any one of whose name, shape, coordinates, and position does not match that of components included in design data. Such data items will hereinafter be referred to as "mismatched data".

The external output button 20 is used for printing the lists 8a and 8b of results of comparison determination, and the save button 21 is used for saving the lists 8a and 8b of results of comparison determination as data into a storage of the arithmetic processing unit 5d of at least one of the browsing terminals 5. The synchronization execution button 22 is used for synchronizing a published data item that has "○" displayed in the corresponding field in the column "link source" and has "×" displayed in the corresponding field in the column "synchronization state" to a design data item.

Returning to FIG. 6, after the results of the comparison determination have been displayed on the monitor 5a as described above, it is determined whether a data update request has been issued (STEP 85 in FIG. 6). More specifically, when the data update button 19 illustrated in FIG. 14 is clicked, it is determined that a data update request is issued, otherwise it is determined that a data update request is not issued.

When the determination is affirmative (YES in STEP 85 in FIG. 6), that is, when the data update button 19 has been clicked, a request for updating mismatched data is output to one of the design terminals 2 used by a designer of the mismatched data (STEP 86 in FIG. 6).

When the request for updating the mismatched data (an update command) is output in this manner, or when a data update request is not issued (NO in STEP 85 in FIG. 6), it is determined subsequently whether an external output operation has been performed (STEP 87 in FIG. 6). More specifically, when the external output button 20 illustrated in FIG. 14 is clicked, it is determined that the external output operation is performed, otherwise it is determined that the external output operation is not performed.

When the determination is affirmative (YES in STEP 87 in FIG. 6), that is, when the external output button 20 has been clicked, in order to print the lists 8a and 8b of the results of the comparison determination, a print command signal is output to the printer 6 (STEP 88 in FIG. 6). Note that, when the external output button 20 is clicked, the contents of the lists 8a and 8b of the results of the comparison determination may be output as file data to an external storage.

When the print command signal is output to the printer 6 in this manner, or when a print operation is not performed (NO in STEP 87 in FIG. 6), it is determined subsequently whether a saving operation has been performed (STEP 89 in FIG. 6). More specifically, when the save button 21 illustrated in FIG. 14 is clicked, it is determined that the saving operation is performed, otherwise it is determined that the saving operation is not performed.

When the determination is affirmative (YES in STEP 89 in FIG. 6), that is, when the save button 21 is clicked, data regarding the lists 8a and 8b of the results of the comparison determination is stored in the storage of the arithmetic processing unit 5d of at least one of the browsing terminals 5 (STEP 90 in FIG. 6).

When the data regarding the lists 8a and 8b of the results of the comparison determination is stored in the storage of the arithmetic processing unit 5d of at least one of the browsing terminals 5, or when the saving operation has not been performed (NO in STEP 89 in FIG. 6), it is determined subsequently whether a synchronization operation has been performed (STEP 91 in FIG. 6). More specifically, when the synchronization execution button 22 illustrated in FIG. 14 is clicked, it is determined that the synchronization operation is performed, otherwise it is determined that the synchronization operation is not performed.

When the determination is affirmative (YES in STEP 91 in FIG. 6), that is, when the synchronization execution button 22 has been clicked, a published data item that has "×" displayed in the corresponding field in the column "synchronization state" is synchronized with a corresponding design data item (STEP 92 in FIG. 6).

When the published data item having "×" displayed in the corresponding field in the column "synchronization state" is synchronized with the corresponding design data item in this manner, or when the synchronization operation has not been performed (NO in STEP 91 in FIG. 6), the present processing is terminated.

Returning to FIG. 2, after the comparison determination processing (STEP 10 in FIG. 2) has been executed as described above, it is determined whether an end operation has been executed (STEP 11 in FIG. 2). More specifically, when the end button 18 illustrated in FIG. 14 is clicked, it is determined that the end operation is performed, otherwise it is determined that the end operation is not performed.

When the determination is negative (NO in STEP 11 in FIG. 2), the present processing is terminated. On the other hand, when the determination is affirmative (YES in STEP 11 in FIG. 2), a flag resetting operation is performed (STEP 12 in FIG. 2). More specifically, the above-mentioned various flags F_EXE, F_SELECT1, F_DATA1, F_SELECT2, F_DATA2, and F_JUDGE are each reset to "0".

Next, the initial screen 6a is displayed (STEP 13 in FIG. 2). After that, the processing is terminated.

As described above, according to the data publishing system 1 of the present embodiment, a user performs the input operation such that published data or design data is selected first, and then the other data is selected. After that, the published data and the design data are compared with each other in order to determine whether the published data and the design data match each other, and the results of this comparison determination are displayed as the lists 8a and 8b (see FIG. 14) on the monitor 5a.

In the list 8a, the results of the comparison determination including the matches and the mismatches of names, shapes, coordinates, and positions are displayed by using "○" and "×". Thus, a user can easily recognize whether a data item regarding a component included in published data selected by the user matches a data item regarding a component included in design data, and when these data items match each other, a prototype can be fabricated by using design data that is estimated to be the most recent design data at that time. On the other hand, when these data items do not match each other, fabrication of a prototype using mismatched published data can be avoided. As a result, the frequency of occurrence of reprocessing of a prototype can be reduced, and the operating time can be shortened, so that the manufacturing costs can be reduced.

In the list 8a of results of comparison determination, in addition to matches and mismatches of names, shapes, coordinates, and positions, an information item indicating whether a user has a browsing authority and an information item indicating whether link information is included in the published data. Thus, the user can easily recognize these information items, so that the convenience can be enhanced.

In addition, when the above-described comparison determination operation is performed, matches and mismatches of names, shapes, coordinates, and positions between a component data item in the published data selected by the user for which the user has a browsing authority and in which link information is present and a component data item in the design data are determined, and thus, it is not necessary to perform determination of matches and mismatches on a component data item in which link information is not present. Therefore, the convenience can be further enhanced.

In the list 8b of the results of comparison determination, in addition to match percentage and mismatch percentage the number of data items that do not include link information and the number of data items for which a user does not have a browsing authority are displayed as the above determination results, and thus, the user can easily recognize the match percentage and the mismatch percentage of the published data with respect to the design data, the number of data items that do not include link information, and the number of data items for which the user does not have a browsing authority, so that the convenience can be further enhanced.

After the comparison determination has been performed, when the data update button 19 is clicked in a state where the lists 8a and 8b of the results of the comparison determination are displayed, a request for updating mismatched data is output to one of the design terminals 2 used by a designer of the mismatched data, and thus, the presence of the mismatched data and a request for updating the mismatched data can be promptly transmitted to a person in charge of the corresponding design data, so that the update of the mismatched data can be performed sooner. As a result, the convenience can be further enhanced.

Note that, although the embodiment is a case where the monitor 5a is used as an output interface, the output interface according to the present disclosure is not limited to this and may be any output interface that is capable of displaying published data. For example, a touch-screen monitor, a three-dimensional (3D) hologram device, or a head-mounted virtual reality (VR) device may be used as the output interface.

Although the embodiment is a case where the keyboard 5b and the mouse 5c are each used as an input interface, the input interface according to the present disclosure is not limited to these and may be any input interface that is capable of selecting published data by being operated by a user. For example, an optical pointing device, such as a laser pointer, or a contact device, such as a touch panel or a stylus pen, may be used as the input interface. Alternatively, a non-contact device that is capable of converting audio into a specified drawing action may be used as the input interface.

Although the embodiment is a case where data items regarding components are used as data items regarding product components included in published data, the data items regarding product components included in published data according to the present disclosure are not limited to these and may be data items regarding any elements corresponding to product components included in published data. For example, data items regarding small units or data items regarding large units included in published data may be used as the data items regarding product components.

Although the embodiment is a case where the names of a large unit, a small unit, and a component are user as component ID information items, the component ID information items according to the present disclosure are not limited to these and may be information items each of which indicates at least one of a product component number and a product component name of a product component. For example, the numbers of a large unit, a small unit, and a component may be used as the component ID information items, and alternatively, both the numbers and the names of a large unit, a small unit, and a component may be used as the component ID information items.

Although the embodiment is a case where information items regarding the shapes of components and information items regarding the coordinates and the positions of the components are both used as component form information items of product components included in published data, information items regarding the shapes of components or information items regarding the coordinates and the positions of the components may be used as component form information items.

Although the embodiment is a case where both match percentage and mismatch percentage are displayed as degree data in the list 8b of results of comparison determination, match percentage or mismatch percentage may be displayed as degree data in the list 8b of results of comparison determination.

Although the embodiment is a case where matches and mismatches between published data and design data are displayed by using "◯" and "×", display of matches and mismatches between published data and design data is not limited to this, and matches and mismatches between published and design data may be displayed by using color coding, Chinese characters, alphabets, or other symbols.

The embodiment is a case where published data or design data is selected first, after which the other data is selected, and then a comparison determination operation is performed on these selected data items. However, after the published data has been selected, when the determination button 17 is clicked without selecting the design data, the comparison determination operation may be performed on all the design data items each of which includes an automobile model name that corresponds to an automobile model name included in the published data.

Although the embodiment is a case where the tree structure of published data and the tree structure of design data each include four levels, which are "automobile model", "large unit", "small unit", and "component", the tree structure of published data and the tree structure of design data may each include three levels or less or may each include five levels or more.

Although the embodiment is a case where the data publishing system is applied to a system for designing components of automobiles, the data publishing system according to the present disclosure is not limited to being applied to such a system and can be applied to various systems that handle design data of industrial equipment. For example, the data publishing system may be applied to a system that handles design data of, for example, construction equipment, ships, or agricultural machines. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A data publishing system comprising:
   a design data storage device that stores design data including first data items regarding a plurality of product components;
   a published data storage device that stores published data including second data items regarding one or more product components, the first data items being associated with the second data items regarding the respective product components;
   an output interface that displays the published data stored in the published data storage device;
   an input interface that is operated by a user; and
   a control unit that, when a user operates the input interface and selects any one of the product components included in the published data, which is displayed on the output interface, performs determination on whether the second data items regarding the product component selected by the user matches the first data items regarding the product component that are included in the design data stored in the design data storage device and that are associated with the second data items regarding the product component selected by the user, and causes the output interface to display a result of the determination.

2. The data publishing system according to claim 1, wherein the design data includes:
   component identification (ID) information items each of which is at least one of a product component number of one of the plurality of product components and a product component name of one of the plurality of product components,
   information items regarding shapes of the plurality of product components, and
   information items regarding coordinates and positions of the plurality of product components, wherein the published data includes:
   component ID information items each of which is at least one of a product component number of one of the one or more product components and a product component name of one of the one or more product components and component form information items each of which is at least one of an information item regarding a shape of one of the one or more product components and an information item regarding coordinates and a position of one of the one or more product components, and wherein the control unit determines whether the component ID information items included in the published data match the component ID information items included in the design data and determines whether the component form information items included in the published data match information items included in the design data that correspond to the component form information items.

3. The data publishing system according to claim 1, wherein the control unit calculates degree data that indicates at least one of a match degree and a mismatch degree of the published data with respect to the design data and causes the output interface to further display the degree data.

4. The data publishing system according to claim 1, wherein the published data includes access authority information that is set so as to be associated with identification information of a user and that indicates whether an authority to access the published data is given to the user, and wherein, when the published data is selected in a state where the identification information of a user has already been input via the input interface, the control unit refers to the identification information and the access authority information and causes the output interface to display whether the published data is accessible by the user.

5. The data publishing system according to claim 1, wherein the output interface displays an update command output unit that is selectable by a user via the input interface, and wherein the control unit outputs, when a user selects the update command output unit, a command for updating at least one of the second data items that is included in the published data and that does not match the design data to a person in charge of the design data.

6. The data publishing system according to claim 1, wherein the control unit determines whether the second data items regarding the product component selected by the user matches the first data items that are included in the design data stored in the design data storage device and that are the latest version of data items.

7. The data publishing system according to claim 1, wherein the published data includes link information items regarding links between the second data items regarding the one or more product components and the first data items regarding the product components that are included in the design data and that correspond to the one or more product components, and wherein the control unit performs, based on the link information items, determination on whether the first data item that corresponds to the product component selected by the user is present in the design data and causes the output interface to further display a result of the determination.

8. The data publishing system according to claim 1, wherein the published data includes link information items regarding links between the second data items regarding the one or more product components and the first data items regarding the product components that are included in the design data and that correspond to the one or more product components, and wherein the control unit performs, based on the link information items, determination on whether the second data items regarding the product component selected by the user and the first data items that are included in the design data and that corresponds to the selected product component are synchronized with each other and causes the output interface to display a result of the determination.

9. The data publishing system according to claim 3, wherein the control unit calculates the degree data with respect to the product component selected by the user.

10. A data publishing method for a system comprising:
a design data storage device that stores design data including first data items regarding a plurality of product components,
a published data storage device that stores published data including second data items regarding one or more product components, the first data items being associated with the second data items regarding the respective product components,
an output interface that displays the published data stored in the published data storage device,
an input interface that is operated by a user, wherein the method comprises:
prompting, by using a computer, a user to operate the input interface and select any one of the product components included in the published data, which is displayed on the output interface;
determining, by using the computer, whether the second data items regarding the product component selected by the user matches the first data items regarding the product component that are included in the design data stored in the design data storage device and that are associated with the second data items regarding the product component selected by the user; and
causing, by using the computer, the output interface to display a result of the determination.

* * * * *